Oct. 24, 1967  H. B. JAMES  3,348,710
METHOD FOR TRANSPORTING VEHICLES
Filed Oct. 4, 1965  2 Sheets-Sheet 1
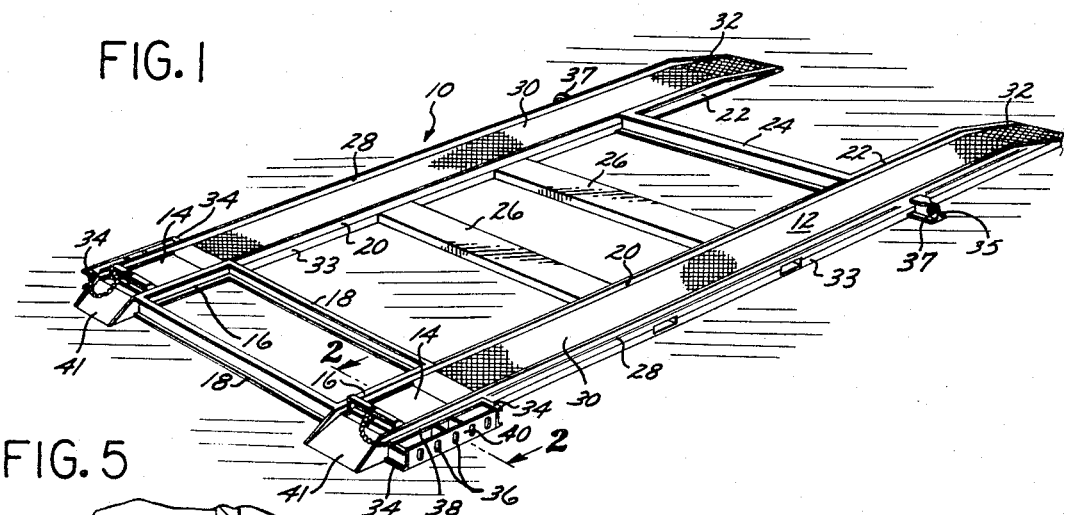
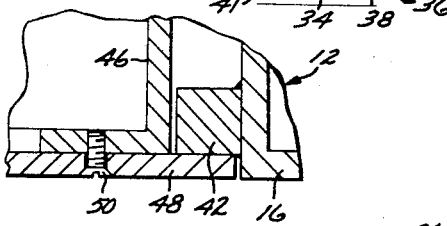
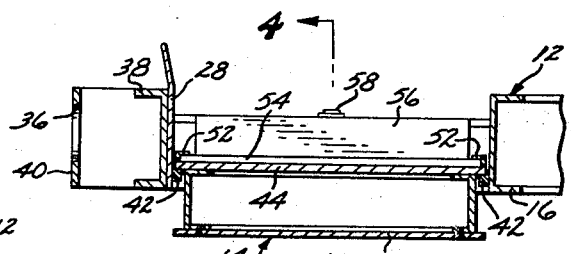
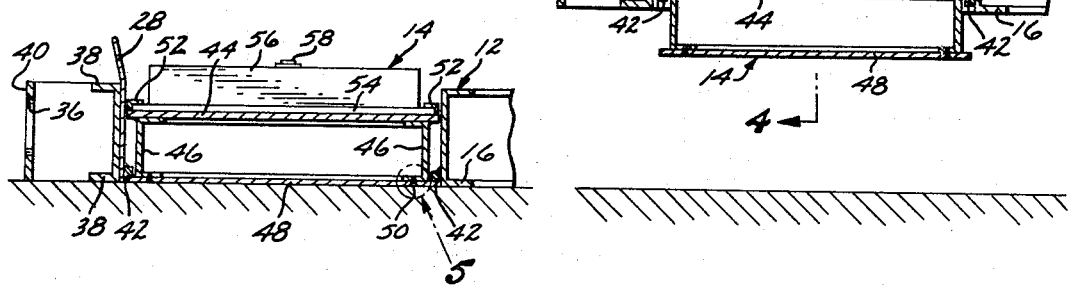
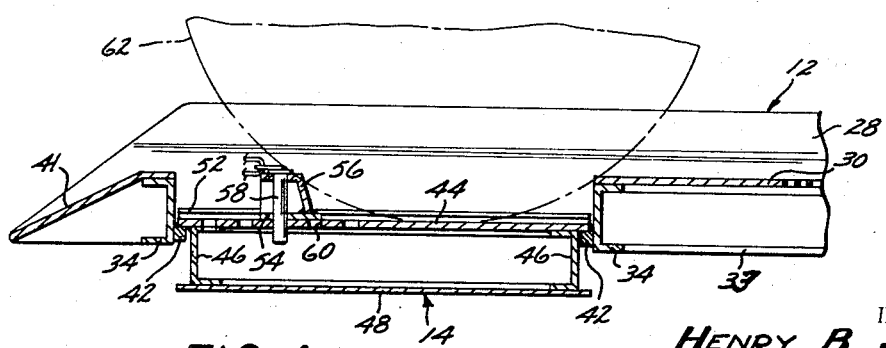
INVENTOR.
HENRY B. JAMES
BY Fulwider, Patton, Rieber,
Lee and Utecht
ATTORNEYS Oct. 24, 1967  H. B. JAMES  3,348,710
METHOD FOR TRANSPORTING VEHICLES
Filed Oct. 4, 1965  2 Sheets-Sheet 2
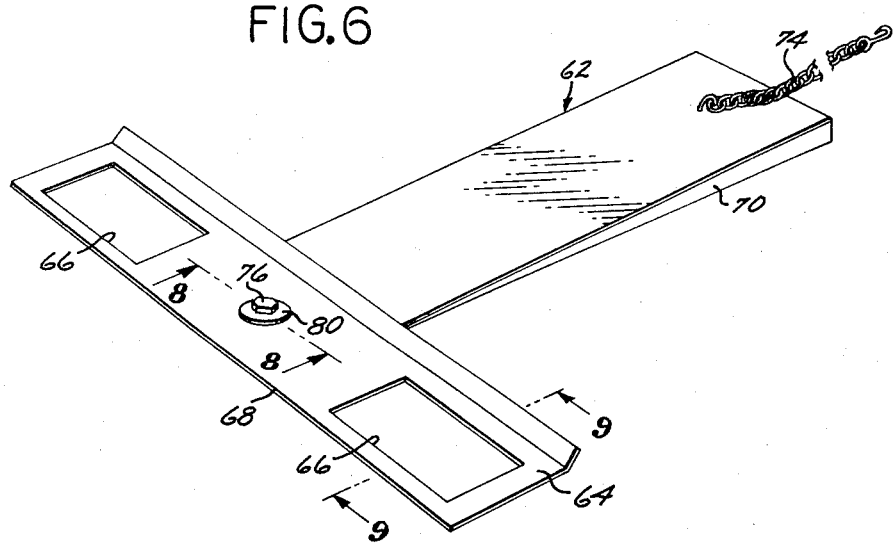
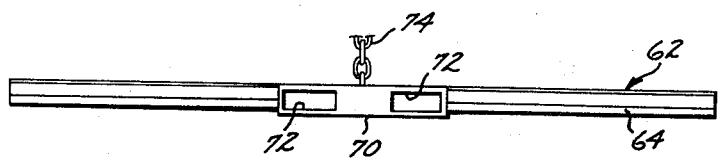
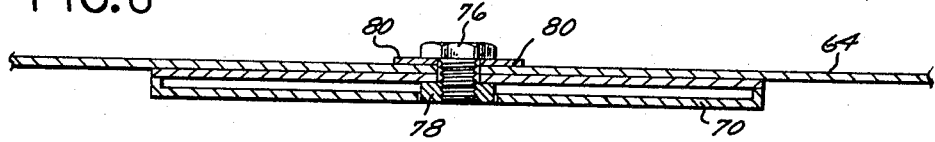
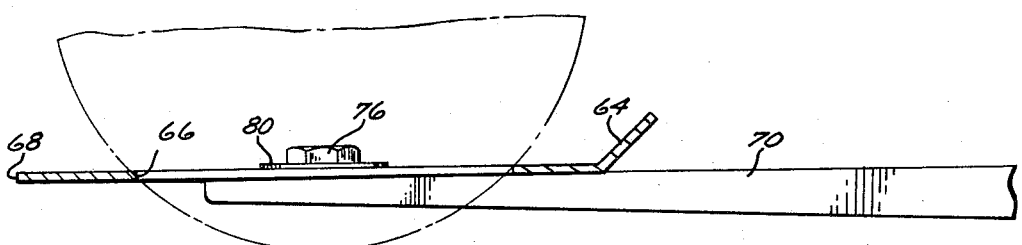
INVENTOR.
HENRY B. JAMES
BY Fulwider, Patton, Rieber,
Lee and Utecht
ATTORNEYS United States Patent Office 3,348,710
Patented Oct. 24, 1967

3,348,710
METHOD FOR TRANSPORTING VEHICLES
Henry B. James, 11881 Stephanie Lane,
Garden Grove, Calif. 92640
Filed Oct. 4, 1965, Ser. No. 492,457
5 Claims. (Cl. 214—152)

ABSTRACT OF THE DISCLOSURE

A method for transporting vehicles by wedging a hoisting member beneath the front wheels of the vehicle and rolling the vehicle on its rear wheels while the front wheels are supported by the hoisting member, and also a method for unloading vehicles from a transporting vessel through the use of a hoisting platform which locks the vehicle in fixed position, which releases the vehicle when the platform is lowered onto a dock, and which facilitates further transportation of the vehicle by means of said hoisting member.

---

The present invention relates to a method for transporting vehicles, and more particularly to a method for unloading vehicles from a transporting vessel at dockside and transporting such vehicles to a parking area.

At the present time vehicles such as automobiles are commonly unloaded from transporting vessels through the use of four wheel hooks which form part of a piece of equipment known as the "spider gear." In this method the automobiles are unloaded from the vessel hold through cargo hatch openings by six men stationed in the hold. These men push or pull one of the automobiles into position beneath the hatch opening and four of the men then place the wheel hooks on the four wheels of the automobile in engagement with the treads.

The four wheel hooks are carried by four wire cables or spider slings which extend upwardly and are attached to the four corners of a rectangular spider framework or spreader. From the spreader the four slings extend further upwardly in an apex and are attached at the apex to the lower end of a usual cargo fall. As is well known to those skilled in the art, the cargo fall is raised and lowered by a winch and laterally positioned by a boom and associated tackle.

The cargo fall and boom are operated to raise the automobile out of the vessel hold by the wheel hooks, and then to lower it onto the unloading dock. The wheel hook attachment procedure is now reversed, four men being required to disengage the hooks and hold them clear until the spider gear is raised out of the way by the winch. The vehicle is next moved to an intermediate or parking area for temporary storage. Since the vehicle is usually not fueled, this move requires one man to drive a towing vehicle and another man to steer the towed automobile. These same men must then push or pull the automobile into its proper parking position. Certain types of vehicles cannot even be towed, but must be hand-pushed, which requires additional manpower.

From the foregoing it is apparent that there is a great deal of waste motion and inefficient utilization of manpower. The attachment and detachment of the wheel hooks is particularly time consuming and wasteful of man hours. Each wheel hook must be handled by a separate man, and the wheel hooks do not always release quickly and easily. The transportation of each vehicle to its parking area is also wasteful of man hours in that one man serves no purpose other than to steer the towed vehicle and make himself available for manhandling the vehicle into its parking position once the parking area is reached. It should also be borne in mind that not only one team of two men is required for this task, but several teams, depending upon the distance at which the parking area is located from the dock unloading area.

It is an object of the present invention to provide a method for reducing cargo handling costs in the unloading of vehicles from a transporting vessel at dockside by using fewer men and by substantially reducing the number of handling operations involved.

Another object of the present invention is to provide a method for unloading and transporting a vehicle from a transporting vessel at dockside and which utilizes a tray or vehicle hoisting platform which is carried by hoisting cables that do not require attachment and removal each time the platform is used to unload a vehicle, thereby eliminating the need for any men to attach and remove wheel hooks and the like.

Yet another object of the invention is the provision of a method for transporting an unfueled, driverless vehicle. In addition, the transporting apparatus can be utilized to remove the vehicle from a hoisting platform when the platform is horizontally oriented upon the dock.

A transporting method of the aforementioned character not only eliminates any need for men to unload the vehicle from the hoisting platform but also eliminates any need for a driver for the vehicle during its transportation to the parking area. Accordingly, general cargo ships which employ a conventional unloading gang for its various types of cargo do not require additional men in the gang organization in order to load vehicles. The same number of men used for handling containers or general cargo are thus also able to load, unload and transport vehicles.

Other objects and features of the invention will become apparent from consideration of the following description taken in connection with the accompanying drawings, in which:

FIG. 1 is a perspective view of a tray or hoisting platform for use according to the present invention, the conventional hoisting cables, spider gear, and hoisting boom being omitted for brevity;

FIG. 2 is an enlarged cross-sectional view taken along the line 2—2 of FIG. 1 and showing a wheel suppoort in its raised position;

FIG. 3 is a view identical to FIG. 2 except that the wheel support is shown in its lowered or depressed position;

FIG. 4 is an enlarged view taken along the line 4—4 of FIG. 3;

FIG. 5 is an enlarged detail view of the area indicated by the numeral 5 in FIG. 2;

FIG. 6 is a perspective view of an apparatus for transporting a vehicle on its rear wheels, according to the method of the present invention, the associated lifting jitney or fork lift truck being omitted for brevity;

FIG. 7 is an end elevational view of the apparatus of FIG. 6, taken from the chain attachment end of the fork lift member;

FIG. 8 is an enlarged detail view taken along the line 8—8 of FIG. 6; and

FIG. 9 is an enlarged detail view taken along the line 9—9 of FIG. 6.

Referring now to the drawings, and particularly to FIGS. 1 through 5 thereof, there is illustrated an apparatus 10 for unloading a vehicle from a transporting vessel at dockside. The apparatus 10 comprises, generally, an elongated, substantially rectangular tray or hoisting platform 12 for supporting a vehicle during hoisting, and a pair of depressable wheel supports 14 at the rearward extremity of the platform 12 for maintaining the vehicle in position upon the platform 12 during hoisting.

The platform 12 is fabricated of steel channels, I beams, plates and expanded metal sections which are cut away and otherwise fitted together at their junctures in welded relation to provide a structurally rigid hoisting platform. More particularly, a pair of longitudinally oriented, transversely spaced apart channels 16 are welded at their forward and rearward ends to a pair of transverse I beams 18 at the rearward end of the platform 12, and a pair of vertically oriented plates 20 having tapered ends abut against and are welded to the forwardly located I beam 18. From this point the plates 20 extend longitudinally to the front end of the platform 12 and define the inner guide edges of a pair of treadways for the platform 12, as will be seen.

At the front end of the platform 12 a pair of channels 22 having tapered forward extremities are welded at their sides to the inner faces of the plates 20 and are also welded at their rearward ends to a transverse I beam 24. Another pair of transverse members 26 are located rearwardly of the I beam 24 and extend through the plates 20 as illustrated. The transverse members 26 are each made of welded plates sections to form a hollow structure having open ends adapted to receive the forks of a lifting pitney or fork lift truck (not shown) os that the apparatus 10 can be transported to and from the work site.

A pair of longitudinally extending, vertically oriented plates 28 are located laterally outwardly of the plates 20 and define the outer edges of the treadways for the platform 12. The plates 28 are similar to the plates 20 except that they are somewhat greater in height and have their upper edge portions tapered outwardly, as best illustrated in FIGS. 2 and 3, to better serve as wheel guides. In addition, they extend further rearwardly so that each defines one side of the opening for a wheel support 14, as will be seen.

The horizontal platform support surfaces for the tires of a vehicle are defined by a pair of treadways 30 which are each constituted of a horizontal, elongated strip of expanded metal or the like which slopes downwardly at its forward extremities to form inclined portions 32 to facilitate rolling of a vehicle onto the platform 12. Each treadway 30 is supported in position by a pair of longitudinally extending channels 33 which are welded at their sides to the confronting faces of the plates 20 and 28 beneath the treadways 30. The forward ends of the channels 33 are tapered to conform to the configuration of the ramp portions 32.

The apparatus 10 can be hoisted by cables attached to its four corners of the platform and for this purpose includes a pair of transversely oriented, short I beam sections 37 welded to the plates 20 and 28 at the forward corners of the platform and forming lateral extensions of the I beam 24. Each of the sections 37 includes a lifting opening or eye 35 through which the hooks of usual hoisting cables may be disposed.

At each of the rearward corners of the platform is an elongated box-like structure having a longitudinally arranged series of openings or lifting eyes 36 to accommodate the hooks of hoisting cables, the various openings 36 permitting attachment of the hoisting cables at a point best suited for the weight distribution of the vehicle being hoisted. Each box-like structure is formed by a welded assembly comprising a pair of laterally oriented channels 34, a channel 38, and a plate 40. The channel 38 is also welded to the outer face of the plate 28.

The channels 34 extend inwardly through and are welded to the plates 20 and 28 to define the forward and rearward margins of the openings for the wheel supports 14, the other margins thereof being defined by the channels 16 and the plates 28.

The ramp portions at the rearward corners of the platform 12 are formed by an inclined plate 41 which, together with its side sections, is welded to the rearward channels 34 to form continuations of the treadways 30.

A perimetrical ledge or stop 42 is welded within each wheel support opening adjacent the base of each channel 16, plate 28, and channel 34 defining the opening. The stop 42 limits downward movement of the associated wheel support 14 within its opening, as best seen in FIGS. 3 and 4.

Each wheel support 14 comprises a rectangular upper plate 44 which is welded at its underside to the top of a rectangular frame constituted of four channels 46. A lower plate 48 is removably secured to the bottom of this same rectangular frame by a plurality of screws 50, as best illustrated in FIG. 5. The channels 46 fit within and are freely slidable vertically past the stop ledge 42, but the upper and lower plates 44 and 48 extend sufficiently to engage the ledge 42 in the raised and lowered positions of the wheel support, respectively, as illustrated in FIGS. 2 and 3.

In the raised position of each wheel support 14, the upper surface of the plate 48 is in engagement with the underside of the stop 42, and the lower surface of the plate 48 is in substantially flush relation with the undersurfaces of the remainder of the platform 12, as illustrated in FIG. 2. In the depressed position of the wheel support, the undersurface of the upper plate 44 engages the upper surface of the ledge or stop 42, as illustrated in FIG. 3, while the lower portion of the wheel support extends below the undersurfaces of the remainder of the platform 12. These two positions of the wheel support constitute the wheel release and wheel hold positions thereof, as will be seen.

A pair of elongated angles 52 are welded at opposite longitudinal edges of each of the upper plates 44 to define slideways for longitudinally slidably receiving a transverse, horizontally oriented plate 54. As best seen in FIG. 4, the plate 54 is welded to the lower edge of a rearwardly and upwardly inclined wheel chock or stop 56. The wheel stop 56 can be locked in one of a plurality of longitudinal positions by means of a pin 58 which is disposable through an opening in a horizontal flange of the wheel stop 42 and through a vertically aligned one of a plurality of longitudinally arranged openings 60 provided in the upper plate 44 of the wheel stop.

As best viewed in FIG. 4, the wheel openings within which the wheel supports 14 are located are closed by the wheel supports when the platform 12 is resting upon the flat dock surface, as seen in FIG. 1. That is, the upper plate 44 is at that time flush with the upper surface of the associated treadway 30. This releases the rear wheels of a vehicle for rolling movement over the treadways 30. When the platform 12 is raised by hoisting apparatus, the wheel supports drop under their own weight and under the weight of the vehicle to the restraining positions illustrated in FIGS. 3 and 4. The vehicle rear wheels, as indicated at 62 in FIG. 4, are then located within the wheel support opening in engagement with the most forwardly located one of the channels 34 at one side, and with the sloping face of the wheel stop 42 at the opposite side, and are thereby constrained against fore and aft rolling.

Longitudinal adjustment of the position of the wheel stops 42 enables the wheel stops to constrain the wheels of various types of vehicles against appreciable fore and aft rolling movement, regardless of their diameter.

In the method of the present invention, the apparatus 10 is utilized for unloading vehicles from a transporting vessel at dockside. In this method the hoisting platform is first coupled at the eyes 35 and 36 to usual hoisting cables so that the platform can be raised and then located in the hatch area of the vessel and in the event that the hatch area is filled with vehicles, the vehicles in this area are first removed by the prior art procedure which utilizes conventional wheel hooks Once the hatch square has been cleared, the platform 12 is located in the cleared area and the hold men roll a vehicle over the treadways until the rear wheels rest upon the wheel support 14. The vehicle hand brake is set and the platform hoisted. On hoisting, the wheel supports drop under the weight of the vehicle and catch and hold the vehicle's rear wheels in the wheel support openings.

The platform is then lowered onto the flat surface of the dock, which automatically urges the wheel supports 14 upwardly into the positions illustrated in FIG. 2. This positions the rear wheels of the vehicle flush with the treadways so that the vehicle can be rolled off the platform after the vehicle hand brake is released. Alternatively, the platform can also be lowered onto the dock so that the wheel supports rest upon a beam or the like with the front of the platform downwardly inclined to permit the vehicle to roll off the platform of its own weight once its hand brake is released.

Assuming the platform is resting flat against the dock with the vehicle hand brake set, a transporting apparatus 62 is next utilized according to the method of the present invention to transport the vehicle to its parking area.

More particularly, and as best illustrated in FIGS. 6 through 9, the transporting apparatus 62 comprises an elongated, horizontally oriented transverse hoisting member 64 having a pair of rectangular wheel openings 66 adjacent the opposite end thereof. The member 64 includes a relatively thin, straight forward or leading edge 68 which can be relatively easily forced beneath the front wheels of a vehicle, the opposite or rearward edge of the member 64 being upwardly inclined to prevent the vehicle wheels from rolling beyond the openings 66.

The transverse member 64 is pivotally mounted to an elongated, wedge-shaped lift member 70 which is substantially rectangular in plan view. The member 70 is hollow and is closed at its thicker end by a plate having a pair of fork apertures 72 adapted to receive the forks of a conventional lift jitney or fork lift (not shown) whereby the lift member 70 may be raised and lowered. A retaining chain 74 is secured at one end to the lift member 70 and is adapted for securement at its other end to the fork lift truck to prevent the lift member 70 from becoming inadvertently disengaged from the lift truck.

The members 64 and 70 are secured together for pivotal movement about a vertical axis by a bolt 76 disposed through the members and secured in position by a nut 78, as best viewed in FIG. 8. The head of the bolt 76 bears against a large washer 80 to facilitate the pivotal movement between the members 65 and 70.

In operation, the transporting apparatus 62 is mounted upon the forks of a lift truck, as previously indicated, and positioned opposite the front wheels of the vehicle to be transported. The edge 68 of the transverse member 64 is forced beneath the front wheels of the vehicle until the wheels drop into the wheel openings 66. The vehicle hand brake is then released and the fork lift truck operated to raise the transporting apparatus 62, which tilts the vehicle upwardly for rolling on its rear wheels. Although the vehicle can be pushed, it is preferably towed to the parking area. Steering is by virtue of the pivotal movement of the transverse member 68 relative to the lift member 70. The steering is much like the steering of a trailer towed by an automobile, the trailer pivoting upon the usual trailer hitch. The freely turning member 68 permits relatively sharp turns to be made, as during parking of the vehicle in a narrow parking stall. After the vehicle hand brake is set, apparatus 22 is slipped out from under the vehicle wheels and the fork lift truck is then ready to transport another vehicle. If necessary, the rear wheels of the vehicle could have been raised by the apparatus 22 to transport the vehicle, in which case the front wheels would be constrained against turning, as by tying the steering wheel to some fixed structure of the vehicle such as the window post.

From the foregoing it will be apparent that by utilizing the method of the present invention in conjunction with a hoisting platform instead of wheel hooks, the men previously needed to attach and detach wheel hooks are no longer necessary. Instead, the platform is left attached to its hoisting cables and the vehicles rolled onto and off the platform during the unloading operations. As previously indicated, the platform can be oriented on the dock so that the vehicle can roll off of its own weight, or the vehicle can be left on the platform and removed by the transporting apparatus by locating the front wheels in the transporting apparatus while the vehicle is still on the platform. Of course, the transporting apparatus can also be positioned beneath the vehicle front wheels after the vehicle is on the dock, if desired. In any event, by rolling the vehicle on its rear wheels to the parking area there is no need for a separate vehicle driver since the fork lift truck driver can easily steer and park the vehicle with the transporting apparatus 62. Accordingly, the present method and apparatus provides a considerable savings in manpower and greatly facilitates vehicle handling during both unloading and transporting operations.

Various modifications and changes may be made with regard to the foregoing detailed description without departing from the spirit of the invention or the scope of the following claims. It will be understood that the claims are intended to cover both loading and unloading operations. Accordingly, the term "unloading" is to be construed as comprehending use of the recited apparatus for loading as well, and as comprehending a loading method which is the reverse of the unloading method recited.

I claim:

1. A method of unloading a vehicle from a transporting vessel at dockside comprising the steps of:
    locating a hoisting platform adjacent said vehicle;
    rolling said vehicle onto said platform;
    hoisting said platform and lowering it onto the dock;
    wedging a hoisting member under the front wheels of said vehicle and raising said front wheels out of engagement with their supporting surface;
    transporting said vehicle off said hoisting platform to a parking area by supporting said front wheels on said hoisting member and rolling said vehicle on its rear wheels;
    lowering said front wheels onto said parking area; disengaging said hoisting member from said front wheels.

2. A method of unloading a vehicle from a transporting vessel at dockside comprising the steps of:
    locating a hoisting platform adjacent said vehicle;
    rolling said vehicle onto said platform;
    hoisting said platform and lowering it onto the dock;
    rolling said vehicle off said platform and onto the dock;
    setting the hand brake on said vehicle;
    wedging a hoisting member under the front wheels of said vehicle and raising said front wheels out of engagement with their supporting surface;
    releasing said hand brake; transporting said vehicle to a parking area by supporting said front wheels on said hoisting member and rolling said vehicle on its rear wheels;
    lowering said front wheels onto said parking area; disengaging said hoisting member from said front wheels; and
    resetting said hand brake.

3. A method of unloading a vehicle from a transporting vessel at dockside comprising the steps of:
    locating a hoisting platform adjacent said vehicle;
    rolling said vehicle onto said platform;
    setting the hand brake of said vehicle;
    hoisting said platform and lowering it onto the dock;
    wedging a hoisting member under the front wheels of said vehicle and raising said front wheels out of engagement with their supporting surface;
    releasing said hand brake;
    transporting said vehicle off said hoisting platform to a parking area by supporting said front wheels on said hoisting member and rolling said vehicle on its rear wheels and pivoting said vehicle on its rear wheels to steer said vehicle during said transporting; and lowering said front wheels onto said parking area.

4. A method of unloading a vehicle from a transporting vessel at dockside comprising the steps of:
locating a hoisting platform adjacent said vehicle;
rolling said vehicle onto said platform;
restraining the rear wheels of said vehicle;
setting the hand brake of said vehicle;
hoisting said platform and lowering it onto the dock;
releasing the rear wheels of said vehicle;
wedging a hoisting member under the front wheels of said vehicle and raising said front wheels out of engagement with their supporting surface;
releasing said hand brake;
transporting said vehicle off said hoisting platform to a parking area by supporting said front wheels on said hoisting member and rolling said vehicle on its rear wheels and pivoting said vehicle on its rear wheels to steer said vehicle during said transporting; and lowering said front wheels onto said parking area.

5. A method of transporting a four-wheeled vehicle resting on its wheels comprising the steps of:
wedging a hoisting member under the front wheels of said vehicle by passing the leading edge of the hoisting member from a position at the front of said front wheels, under said front wheels, and to a handling and hoist position rearwardly of said front wheels, and raising said front wheels out of engagement with their supporting surface;
transporting said vehicle to a different location by supporting said front wheels on said hoisting member and rolling said vehicle on its rear wheels;
lowering said front wheels; and
disengaging said hoisting member from said front wheels.

References Cited

UNITED STATES PATENTS

| 1,591,278 | 7/1926 | Brush | 214—15 |
| 3,258,146 | 6/1966 | Hamilton | 214—620 |

FOREIGN PATENTS 869,352  5/1961  Great Britain.

GERALD M. FORLENZA, *Primary Examiner.*
ROBERT G. SHERIDAN, *Examiner.*